UNITED STATES PATENT OFFICE.

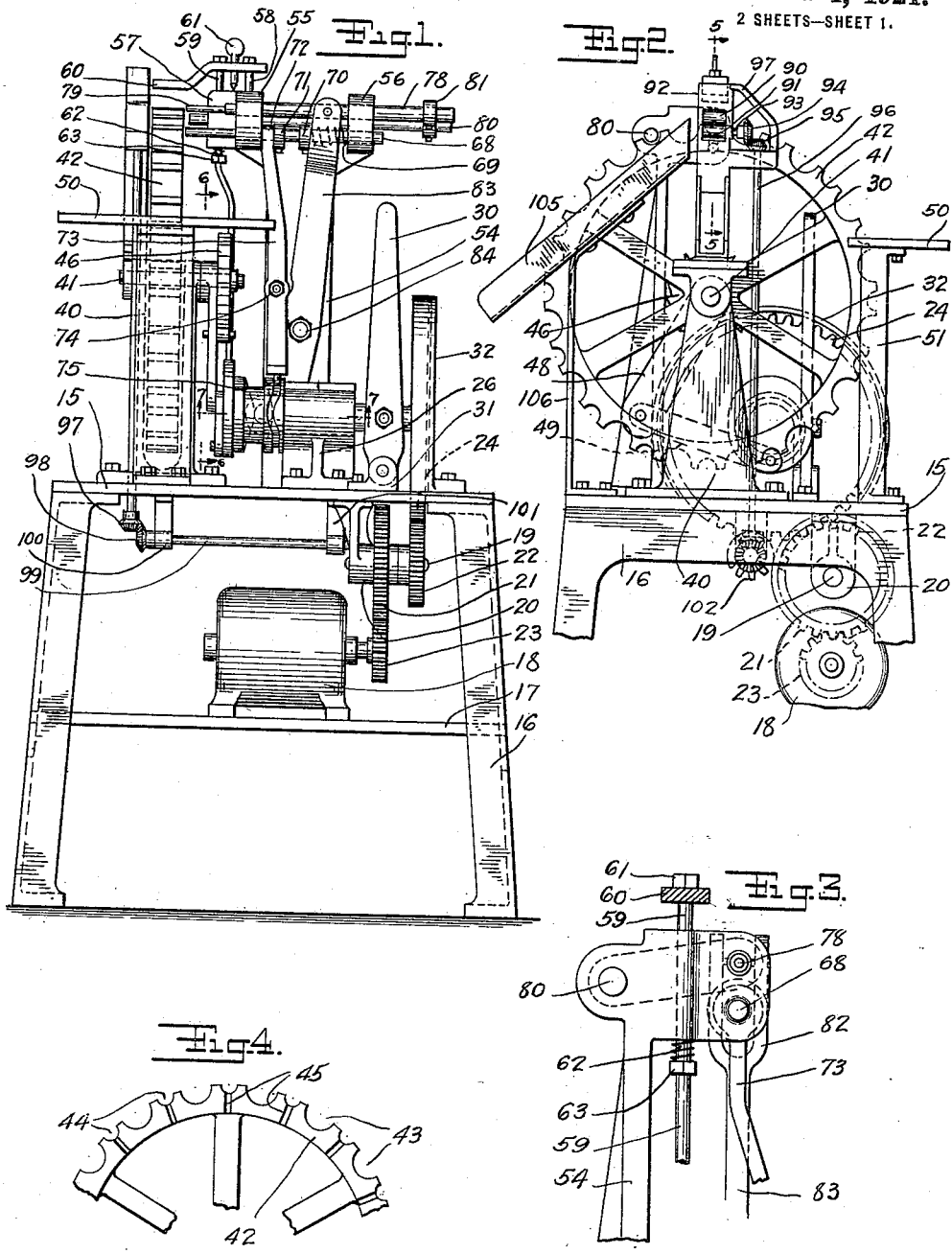
C. S. LEONARD.
FRUIT PITTING MACHINE.
APPLICATION FILED MAY 5, 1921.
1,392,690. Patented Oct. 4, 1921.
2 SHEETS—SHEET 1.
Inventor
Chester S. Leonard
By his Attorney
Charles L. Wright C. S. LEONARD.
FRUIT PITTING MACHINE.
APPLICATION FILED MAY 5, 1921.
1,392,690.
Patented Oct. 4, 1921.
2 SHEETS—SHEET 2.
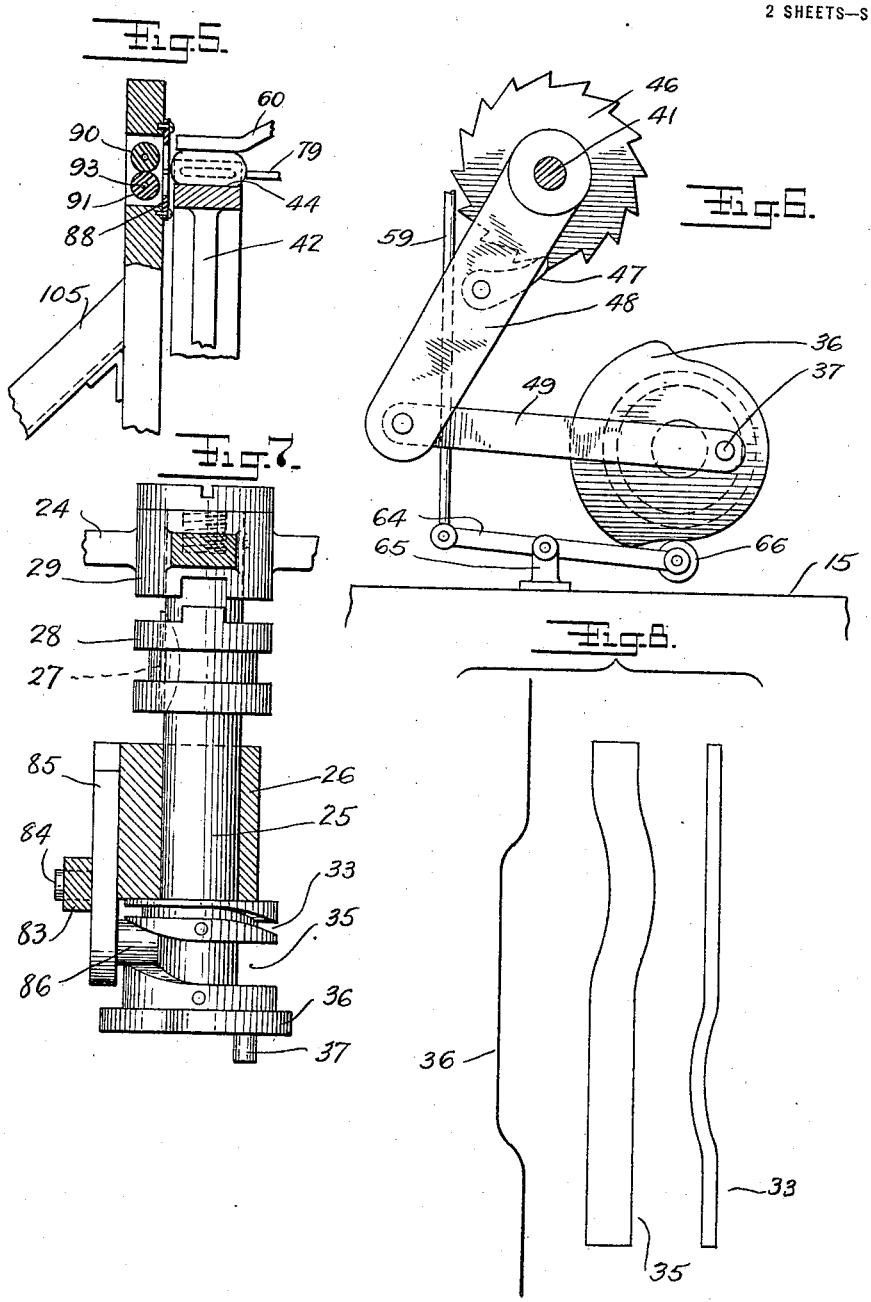
Inventor
Chester S. Leonard
By his Attorney
Charles L. Wright

CHESTER S. LEONARD, OF LANSDOWNE, PENNSYLVANIA.

FRUIT-PITTING MACHINE.

1,392,690. Specification of Letters Patent. Patented Oct. 4, 1921.

Application filed May 5, 1921. Serial No. 466,923.

*To all whom it may concern:*

Be it known that I, CHESTER S. LEONARD, a citizen of the United States, and a resident of Lansdowne, in the county of Delaware and State of Pennsylvania, have invented certain new and useful Improvements in Fruit-Pitting Machines, of which the following is a specification.

The main object of this invention is to provide a machine adapted to expel the seeds or pits from fruit, special reference being made to dates in their ordinary semi-dry commercial condition.

A further purpose is to produce a mechanism for pitting dates in an effective manner, automatically after being fed to the machine, thus avoiding manual contact, and which disrupts the pit without disfiguring the fruit.

Dates, as used in making confections by removing the pit and inserting in its place a nut or filling of soft candy, known as fondant, are extensively used and considered favorably as a sweetmeat.

The cost of manufacture is however greatly enhanced by the slow and tedious operation of removing the pits by hand, the waxy pulp within the skin being tenacious while the exterior is wrinkled, irregular and sticky, rendering the labor difficult and unpleasant.

Another object then is to remove the pits expeditiously and coincidently form a recess to receive the filling.

These and other objects, which will become more apparent as the description progresses, are attained by the novel construction, combination and arrangement of parts, hereinafter described and shown in the accompanying drawings, forming an essential part of this disclosure, and in which:—

Figure 1 is a side elevational view of a machine made in accordance with the invention.

Fig. 2 is a front view of the same.

Fig. 3 is a fragmentary transverse vertical sectional view looking from the front upper portion of Fig. 17, drawn to an enlarged scale.

Fig. 4 is a partial side elevational view of the carrier wheel in detail.

Fig. 5 is a sectional view taken on line 5—5 of Fig. 2, indicating the position of the fruit just prior to expelling the pit.

Fig. 6 is an enlarged transverse sectional view taken on line 6—6 of Fig. 1.

Fig. 7 is a horizontal sectional view taken in a plane corresponding to line 7—7 of Fig. 1.

Fig. 8 is a diagrammatic view of the several cams collectively, as they would appear in plane projection.

Stated briefly in general terms, the machine comprises a stand having an intermittently actuated carrier wheel into which the fruit is fed during the brief cessation of its movement and then advanced into alinement with a cam operated plunger.

A spring finger clamps the fruit automatically as the plunger advances to pierce the fruit lengthwise, expelling the pit, which is forced outward through a diaphragm and engaged by elastic rollers which carry the pit outward, the fruit being held in the recesses of the wheel by the clamp finger and diaphragm.

Upon the further advancement of the wheel, the clamp finger is raised and an ejector pushes the fruit into a chute whence it is conveyed to a receiver.

All the several moving elements of the machine are accurately timed to operate in proper sequence and driven by a motor under ready control of an operator.

Referring now more specifically to the drawings in detail, the numeral 15 designates a platform or stand supported by legs 16 resting upon the floor.

A shelf 17, carried by the legs, supports a motor 18 actuated by an electric current conducted in the usual manner, and controlled by a switch not shown.

A counter shaft 19 is supported by a bracket 20 attached to the lower side of the platform 15, and fixed to the shaft is a spur gear 21 and pinion 22, the gear meshing with a pinion 23 secured on the motor, and the pinion 22 meshes with the driving gear 24 of the machine.

While a gear train driver is indicated, it will be understood that the gear 24 and pinion 23, of the motor may be discarded and pulleys of suitable dimensions substituted if such be preferred.

The driving gear 24 or pulley is revolubly mounted on the outer end of a shaft 25 rotatable in a bearing 26 fixed on the upper surface of the platform 15, the shaft having a key 27 by which is slidably engaged a clutch element 28, its operative end being engaged with mating clutch elements formed on the hub 29 of the gear or wheel.

The clutch is caused to engage or release by a lever 30 pivoted on a bracket 31 in such manner as to transmit rotary motion to the shaft 25 or instantly release the same at will in a manner which will be readily understood. In order to protect the teeth of the gear 24 or belt passing over an equivalent pulley, a guard 32 is secured to the platform 15 in such manner that its flange projects over the periphery of the gear or wheel as shown.

On the opposite end of the shaft 25 is secured a cam head containing two cylindrical cam grooves, respectively 33 and 35 and a raising cam 36, from the outer flat surface of which projects a crank pin 37 the purpose of which will be further described.

A pair of standards 40 are fixed to the platform 15, the same having appropriate bearings near their upper ends for a shaft 41 having mounted upon it, between the standards a spoked wheel 42, its rim containing a plurality of recesses 43 for reducing the weight and intermediate these recesses are finished grooves 44 shaped to receive the fruit to be operated upon.

This carrier wheel has in its side adjacent the drive wheel radial slots 45 positioned with reference to the grooves 44 and serve as sockets to receive a lock plunger further on described.

Fixed to the inner extending end of the shaft 41 is a ratchet wheel 46, the number of its teeth conforming to the number of grooves 44, this ratchet being actuated by a pawl 47 pivoted to an arm 48, one end of which encircles the shaft 41, the other end being pivotally engaged with a link 49 connected with the crank pin 37.

Thus, when the machine is operated intermittent rotary motion is constantly transmitted to the carrier wheel.

A shelf-like plate 50 is arranged contiguous to the periphery of the wheel 42 from which the fruit is delivered to its grooves 44 during the intermissions of its movement, the shelf being supported by a bracket 51 fixed to the platform.

At the rear of the platform is another standard 54, branched at its upper end into forwardly extending bosses 55 and 56, the boss 55 having a lug 57 extending toward the wheel 42 at a point approximately at its center.

This lug is drilled vertically to receive a guide pin 58 and a rod 59, both the pin and rod being fixed in a bent finger 60 extending over the wheel and provided with an adjusting screw 61 to limit its downward movement.

Encircling the rod 59 is a helically coiled spring 62 its ends abutting respectively against the extending bottom of the lug 57 and collar 63 adjustably fixed upon the rod so as to normally press the finger 60 downward.

The lower end of the rod is pivoted to a lever 64, fulcrumed on a bracket 65 fixed on the platform 15. the opposite end of the lever carrying a roller 66 in contact with the periphery of the cam 36 so that as its raised portion is in contact the finger 60 will be raised and held raised due to the dwell of the cam.

Both the bosses 55 and 56 are bored at right angles to the axis of the wheel 42, the lower bored opening slidably receiving a bar 68 having a point adapted to engage the slots 45 of the carrier wheel when impelled forward by a coiled compression spring 69 abutting between the lug 56 and a collar 70 fixed adjustably on the bar.

A similar collar 71 fixed to the bar receives the thrust of a fork 72 formed on the upper end of a lever 73 fulcrumed on a stud 74 set in the standard 54, the lower end of the lever being offset and carrying a roller 75 operating in the cam groove 33, thus transmitting rectilinear movement to the bar at predetermined intervals.

In the upper bored openings of the bosses 55 and 56 is another slidable bar 78 having an attenuated or reduced end 79 adapted to pass through the center of the grooves 44 and pierce any fruit contained therein.

Similar bored openings are formed in the lugs at the rear of the bosses and slidably mounted therein is a plunger rod 80, the same being rigidly connected to the bar 78 by a yoke 81 provided with means for adjustment, the rod 80 thus moving in unison with the bar 78 and acting as an ejector for the fruit after it has been pitted.

Motion is communicated to the bar 78 by its connection with a fork 82 formed at the upper end of a lever 83 fulcrumed on a stud 84 set in the standard 54, the fork 82 being sufficiently deep to clear the bar 68 which passes freely through it.

The lower end of the lever 83 is slotted and engaged by a pin 84 to a slide 85, operable in a guide formed with the bracket 26 at its rear side, and to which is engaged a roller 86 operable in the cam groove 35.

As the pit is pressed from the fruit by the plunger 79 it passes through a flexible diaphragm 88 having a suitable aperture but which prevents the passage of the fruit.

The pit is then grasped between a pair of flexible rollers 90 and 91 carried in a housing 92 mounted on the outer standard 40, the lower roller being fixed on a spindle 93 its extending end having fixed on it a bevel pinion 94 meshing with a mating pinion 95 mounted on the upper end of a vertical shaft 96, the same being housed and guarded by a casing 97 formed with the housing 92.

The lower end of the shaft 96 passes through the platform 15 and carries a bevel pinion 97 meshing with a mate 98 fixed on the end of a horizontal shaft 99 carried in brackets 100 and 101 fixed to the lower side of the platform, the opposite end of the shaft 96 having a spur pinion 102 meshing with the teeth of the gear 22.

It will be apparent that a belt drive may be substituted for the gears as described if preferred.

The pitted fruit, when ejected, is received in a chute 105, supported by a bracket 106, and by it conveyed to a receiver for that purpose.

A similar chute may be used, if desired, for taking away the pits.

In operation, the machine being clutched to the motor driven wheel, the wheel 42 will be turned through a portion of a revolution and then, for a moment become stationary, at which time a date is inserted from the table 50 to one of the grooves 44 of the wheel, at that time in register.

Due to the timing of the cams the lock bar is released and pressed forward by its spring to engage in the slot 45 as it passes, thus halting its further forward rotation.

The spring actuated finger moves down, clamping the fruit and immediately the piercing plunger enters the fruit at one end, ejecting the pit, pushing it through the diaphragm into the constantly revolving rollers by which it is carried away.

The piercing plunger is then withdrawn and the wheel rotated to present the next groove into position for operation.

As the ejector plunger moves coincidentally with the pitting plunger, it will be apparent that the fruit is successively ejected into the chute and conveyed to any desired point.

As changes of construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:—

1. A fruit pitting machine comprising a stand, a carrier wheel having grooves in its periphery mounted on said stand, means for intermittently actuating said wheel, a table from which fruit is fed to said wheel, means for clamping the fruit in the mentioned grooves, and means for expelling the pit from the fruit while clamped.

2. A fruit pitting machine comprising a stand, a grooved carrier wheel rotatable in a vertical plane thereon, means for progressively actuating said wheel, means for locking the wheel during the intermissions of its movement, a compressive device for holding fruit in the grooves of said carrier when undergoing operation, and means for piercing the fruit in the direction of its length, said piercing means expelling the pit therefrom.

3. A fruit pitting machine comprising a stand, a grooved carrier wheel rotatable thereon, intermittent actuating means for said wheel, a spring actuated clamp finger operative with respect to the grooves of said wheel, means for releasing said finger, means for expelling the pit from the fruit when clamped, and means for ejecting the fruit from said wheel.

4. A fruit pitting machine comprising a stand, a carrier wheel having transverse grooves in its periphery adapted to receive fruit mounted on said stand, a ratchet wheel operatively engaged with said carrier wheel, a crank carried pawl for said ratchet wheel, a drive shaft on which the crank is mounted, a spring pressed finger adapted to clamp fruit in the grooves of said wheel, means for adjusting said finger, a cam on said shaft for raising said finger, a fruit piercing and expelling plunger, a second cam on said shaft for actuating said plunger, an ejector actuated by said second cam, a spring impelled lock bar engaging openings in said wheel, and a third cam on said shaft for retracting said lock bar, said crank and cams being timed to operate in sequence.

5. A fruit pitting machine comprising a stand, a motor, a shaft mounted horizontally on said stand, a wheel revoluble on said shaft, driving connections between said motor and wheel, clutch elements for engaging or disengaging said wheel and shaft, a plurality of cams on said shaft, the outermost of said cams carrying a crank, a rotary fruit carrier on said stand, means operated by said crank including a ratchet for transmitting intermittent motion to said carrier, a spring impelled bolt for locking said carrier, means actuated by one of said cams for retracting said bolt, a spring pressed finger for clamping fruit in said carrier, means actuated by another of said cams for releasing said finger, a pit expelling plunger actuated by another of said cams, an ejecting plunger and a yoke adjustably connecting said plungers to operate in unison.

6. A fruit pitting machine comprising a stand, a motor, a shaft mounted horizontally on said stand, a wheel revoluble on said shaft, driving connections between said motor and wheel, clutch elements for engaging or disengaging said wheel and shaft, a rotary fruit carrier driven intermittently by said shaft, transversely slidable plungers for locking said carrier, for expelling the pit from the fruit in said carrier and for ejecting the fruit after removal of the pit, cams on said shaft for each of said plungers, elastic friction rolls adapted to receive the pits after ejection, and connections for driving said rolls actuated by said wheel.

7. In a fruit pitting machine, the combination with a fruit carrier and a pit expeller, of a perforate member adjacent the side of said carrier, said member permitting the pit to pass therethrough but preventing the passage of the fruit, and elastic rolls exterior of said member adapted to grasp the pit and convey it outward.

8. In a fruit pitting machine, the combination with rotary fruit carrier and a reciprocating pit expeller mounted transversely thereto, of stantionary means registering with said expeller on the opposite side of said carrier through which the pit is pressed, said means preventing the passage of the fruit, a pair of elastic rolls adjacent said means adapted to grasp the pit, and means for continuously actuating said rolls.

In testimony whereof I have signed my name to this specification.

CHESTER S. LEONARD.